(12) United States Patent
Alexander et al.

(10) Patent No.: US 9,819,735 B2
(45) Date of Patent: Nov. 14, 2017

(54) METHOD OF CONCERTED DATA SYNCHRONISATION ACROSS A WIRELESS MESH NETWORK

(71) Applicant: TEXECOM LIMITED, Lancashire (GB)

(72) Inventors: Peter Alexander, Greater Manchester (GB); Reuben Morgan, Greater Manchester (GB)

(73) Assignee: TEXECOM LIMITED, Haslingden, Lancashire (GB)

( * ) Notice: Subject to any disclaimer, the term of this patent is extended or adjusted under 35 U.S.C. 154(b) by 370 days.

(21) Appl. No.: 14/374,474

(22) PCT Filed: Jan. 25, 2013

(86) PCT No.: PCT/EP2013/051420
§ 371 (c)(1),
(2) Date: Jul. 24, 2014

(87) PCT Pub. No.: WO2013/110747
PCT Pub. Date: Aug. 1, 2013

(65) Prior Publication Data
US 2014/0365435 A1    Dec. 11, 2014

(30) Foreign Application Priority Data

Jan. 27, 2012    (GB) .................................. 1201350.4

(51) Int. Cl.
*G06F 17/30*    (2006.01)
*G06F 17/00*    (2006.01)
(Continued)

(52) U.S. Cl.
CPC .... *H04L 67/1095* (2013.01); *G06F 17/30578* (2013.01); *H04L 45/32* (2013.01);
(Continued)

(58) Field of Classification Search
CPC .. G06F 8/65; G06F 17/30575; G06F 11/3495; G06F 9/5072; G06F 11/0709;
(Continued)

(56) References Cited

U.S. PATENT DOCUMENTS 8,340,672 B2 * 12/2012 Brown .............. H04W 52/0216
370/324
8,909,276 B2 * 12/2014 Lim .................... H04W 76/023
370/252
(Continued)

FOREIGN PATENT DOCUMENTS

CN          1710910 A       7/2005

OTHER PUBLICATIONS

Kunito, G et al, An Ad Hoc Routing Control Method in Sensor Networks, Industrial Electronics Society, 2000, IECON 2000, 26th Annual Conference of the IEEE Oct. 22-28, 2000, Piscataway NJ US, IEEE vol. 2, Oct. 22, 2000, pp. 1147-1152.

*Primary Examiner* — Yicun Wu
(74) *Attorney, Agent, or Firm* — Barlow, Josephs & Holmes, Ltd.

(57) ABSTRACT

A method for concerted synchronization of data across a wireless mesh network comprises transmission of a broadcast message to a target device via a predicted route that is capable of being acknowledged by at least one network device not on the predicted route. The data is assimilated from at least one network device, and is capable of addition to a broadcast message. In this way, it is possible to synchronize a plurality of network devices via one outgoing broadcast message and one incoming broadcast message.

13 Claims, 1 Drawing Sheet

(51) Int. Cl.
*H04L 29/08* (2006.01)
*H04W 40/02* (2009.01)
*H04L 12/721* (2013.01)
*H04L 12/24* (2006.01)
*H04L 12/26* (2006.01)
*H04L 12/18* (2006.01)

(52) U.S. Cl.
CPC ........... *H04L 45/34* (2013.01); *H04W 40/023* (2013.01); *H04L 12/189* (2013.01); *H04L 41/0853* (2013.01); *H04L 43/0817* (2013.01); *Y02B 60/50* (2013.01)

(58) Field of Classification Search
CPC .. G06F 2201/815; G06F 8/61; G06F 11/0793; G06F 11/1451; G06F 11/1469; G06F 11/3006; G06F 11/323; G06F 11/3672; G06F 17/30312; G06F 21/6218; G06F 2201/84; G06F 2201/87
See application file for complete search history.

(56) References Cited

U.S. PATENT DOCUMENTS

| | | | |
|---|---|---|---|
| 2005/0249186 A1* | 11/2005 | Kelsey | H04L 1/18 370/349 |
| 2007/0183360 A1* | 8/2007 | Arunan | H04W 76/02 370/328 |
| 2007/0286097 A1* | 12/2007 | Davies | H04L 45/02 370/255 |
| 2008/0221988 A1* | 9/2008 | Bappu | G06Q 30/0239 705/14.39 |
| 2009/0010190 A1 | 1/2009 | Gong | |
| 2009/0116579 A1 | 5/2009 | Abraham | |
| 2010/0172308 A1* | 7/2010 | Nam | H04L 1/1829 370/329 |
| 2011/0134797 A1 | 6/2011 | Banks | |
| 2011/0216656 A1 | 9/2011 | Pratt | |

* cited by examiner

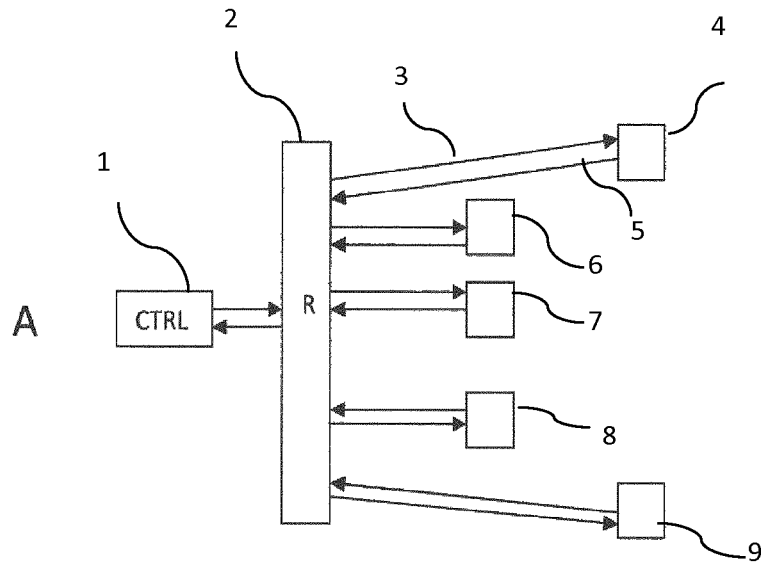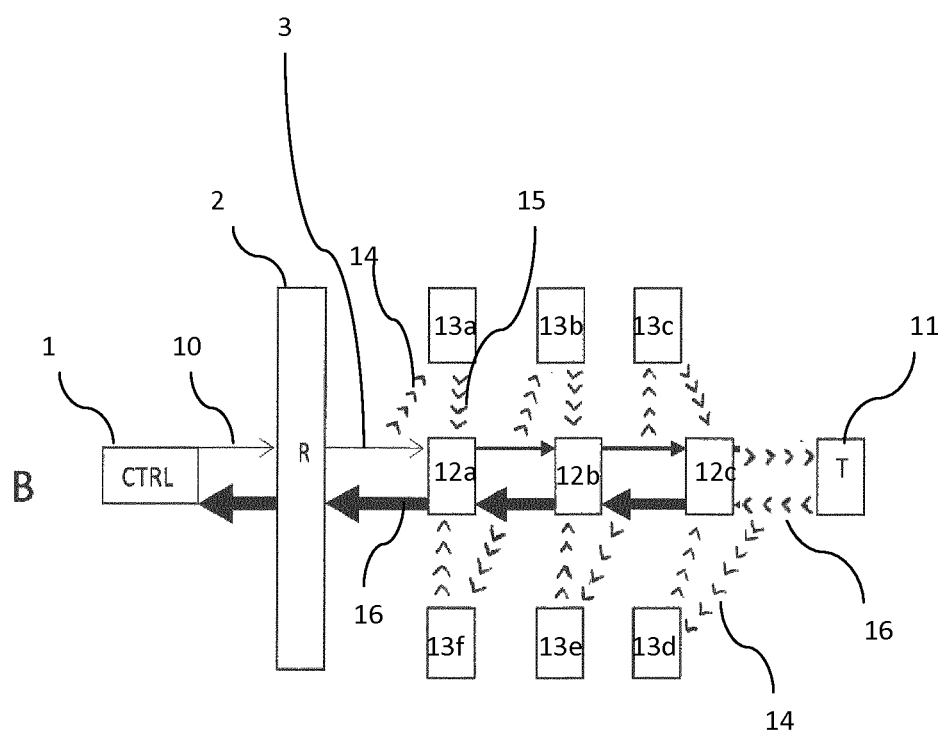

METHOD OF CONCERTED DATA SYNCHRONISATION ACROSS A WIRELESS MESH NETWORK

The present invention relates to an improved method of synchronising data within a wireless mesh network arrangement that provides concerted synchronisation of data between a plurality of network devices so as to reduce the time and power resources used for data synchronisation.

A wireless mesh network arrangement typically comprises a control panel, a plurality of network devices and a receiver for exchanging data between the control panel and the network devices. Data can be exchanged across the wireless network arrangement, such as for example, for the purposes of changing a network device's configuration or mode of operation and also to retrieve up to date status information from the device which can then be communicated back to the receiver and control panel.

This exchange of data can subsequently be used to identify target devices that, for example may require a change of mode of operation, or be malfunctioning. Typically, this data exchange process is done individually for each device, such that a message is sent by the receiver to a target device, the target device responds to the message accordingly and then a new message is sent to a second target device which then responds to the message. This process continues until all devices within the wireless mesh network arrangement have responded to their respective messages.

It will be appreciated that this arrangement can consume significant time and power resources, especially if all network devices are required to change their mode of operation. This could occur for example, in the case of a security system comprising a wireless network arrangement where it will be necessary to "arm" the system and thus inform each device of the new "armed" status of the system. It will be appreciated that in the conventional arrangement as described above, this "arming" process could take up to 30 seconds for each device to receive and acknowledge their change in mode of operation.

Accordingly, it is an object of the present invention to provide an improved method of synchronising data within a wireless mesh network arrangement that provides concerted synchronisation of data between a plurality of network devices, so as to reduce the time and power resources used for data synchronisation across all relevant devices within a network.

Thus and in accordance with the present invention there is provided a method for concerted synchronisation of data across a wireless mesh network, comprising transmission of a broadcast message to a target device via a predicted route, that is capable of being acknowledged by at least one network device not on said predicted route, and assimilation of data from at least one network device, said data being capable of addition to a broadcast message, so as to synchronise a plurality of network devices via one outgoing broadcast message and one incoming broadcast message.

Preferably, the method of data communication is capable of being applied to a wireless mesh network arrangement, including but not limited to a battery operated wireless mesh network arrangement.

The mesh network arrangement may comprise a control panel, a receiving device for receiving data from, for example, the control panel and/or other devices within the mesh network arrangement, and a plurality of network devices located within the mesh network, capable of data exchange and communication.

Preferably, the control panel is capable of receiving data from devices comprising the mesh network arrangement, such that it may be aware of each device's status at a given time so that the control panel can identify any devices that may be required to transmit or receive data, such as for example devices whose current status is not up to date according to the data held by the control panel or devices that require a mode change.

The control panel is most preferably able to collate data received from the network devices, in particular data relating to the state and configuration of the devices comprising the mesh network arrangement. This may improve the efficiency with which data may be communicated within the mesh network and may further assist in identifying communication errors or device malfunctions. Said collated data may form, for example, a list of devices that are to be sent a particular communication.

The control panel is preferably able to communicate said collated data to devices within the mesh network, including but not limited to a receiving device.

The receiving device is most preferably able to locate a specific target device within the mesh network arrangement, with which to communicate data. Said target device may be selected according to parameters including but not limited to its particular location within the network.

The receiving device is also most preferably capable of transmitting messages to devices within the mesh network, including but not limited to the control panel and remote network devices.

The receiving device is preferably able to communicate with a target device either directly or via at least one intermediate network device. Said communication may be based on established routes of communication that may be stored in a routing table or other such similar device, or be routed via a new route to the target device.

Most preferably, the receiving device is capable of transmitting a single message (an outgoing broadcast message) to a target device, via at least one intermediate device on a communication route. Other devices within the network arrangement may be able to detect, receive and respond to said outgoing broadcast message, even if they are not directly on the prescribed communication route.

The devices within the network arrangement are most preferably assigned a unique communication window in order that each device has its own allocated time slot for communication with other devices, so as to prevent devices from sending messages out at the same time as another device, which may affect delivery and receipt of the message. Thus, each network device is most preferably configured to wait until its allocated time slot to send a message to another device within the network arrangement.

Said outgoing broadcast message may comprise data including but not limited to required modes of operation for the network devices.

Devices within the network arrangement may be able to respond to messages such as for example by compiling and transmitting an acknowledgement message.

Said acknowledgement message may be generated at an individual, intermediate device within the network arrangement and comprise said individual intermediate device's data, including but not limited to device status, or alternatively be generated by the target device, in which case the acknowledgement message may comprise an array of all device data, i.e. data from all devices that have acknowledged receipt of the original outgoing broadcast message.

This array of device data may then be communicated back to the receiving device, via intermediate network devices.

Said intermediate network devices may further be capable of adding data to the existing array of device data, so as to provide a means of data assimilation in relation to the outgoing broadcast message and incoming reply message.

The incoming reply message may comprise an array of data responses provided by devices within the network arrangement. This data may then be used to identify any devices that have not responded, in order that a subsequent outgoing broadcast message may be sent to attempt to establish communication with the non-responsive devices.

It is preferred that this repeat broadcasting process be repeated for several attempts and in the event of continued failure of a device to communicate, the receiver may establish an alternative route by which to seek communication with a device.

In the event of a device failing to respond in spite of all possible routes of communication being attempted, it is most preferable that the receiver will communicate this failure to the control panel, including but not limited to identifying the malfunctioning device to the control panel. The malfunctioning device may then be easily identified by, for example a system engineer, via the control panel in order that the malfunction can be investigated.

The invention will now be described further by way of example only and with reference to the drawing in which;

FIG. 1 shows a schematic representation of (A) a conventional method of synchronising network devices with a receiver within a wireless mesh network arrangement and; (B) the method of concerted data synchronisation in accordance with the present invention.

Referring now to FIG. 1, route A illustrates a conventional method of synchronising a plurality of network devices, with a receiver within a wireless mesh network arrangement.

In a conventional arrangement, a control panel 1 would send a communication to a receiving device 2, such as for example, data relating to required device modes of operation for a plurality of network devices, within the wireless mesh network arrangement.

The receiver then sends an outgoing message 3 to a first target device 4 within the network and waits for its acknowledgement. The target device 4 receives the message and updates itself with the new data contained in the outgoing message 3. The target device 4 then transmits an acknowledgement message 5 back to the receiving device 2, usually using the same route as that taken by the outgoing message 3.

Upon receiving the acknowledgement message 5 from the target device, the receiver 2 then transmits a new outgoing message 3 to a second target device 6 and again, waits for receipt of an acknowledgement message 5 before moving on to synchronise with the subsequent network devices 6, 7, 8 and 9, and so on.

It will be appreciated that this process is not only time consuming, which may be unfeasible in circumstances where it is necessary to quickly update a plurality of devices, but also consumes a significant amount of power, which may make it unsuitable for battery operated network devices.

Route B however, illustrates schematically, the concerted synchronisation of a plurality of network devices with a receiver 2, within a wireless mesh network.

The control panel 2 transmits a message 10 to the receiver 2. Said message 10 comprises a list of network devices that the control panel 2 needs to synchronise with, for example devices from which the control panel 2 requires updated status information from, or devices which require a change in their mode of operation.

Such synchronisation requirements may be due to a change in system state. For example, in the case of a security system comprising a mesh network arrangement, it may be necessary to inform network devices that the control panel has been "armed" and that therefore a mode of operation change may be required. It is important that this change in status be quickly communicated and acknowledged by the network devices, so as to effect the arming process as quickly as possible.

The receiver 2 identifies a suitable target device 11 from the list of network devices sent by the control panel 1, to which to direct an outgoing broadcast message 3. The outgoing broadcast message 3 is then sent out wirelessly via the receiver 2 to the target device 11, via devices 12 that are on a predicted route of communication between the target 11 and the receiver 2.

As only a single target device 11 is identified from the outset and each network device knows its location within the network and also how far away it is from the target, messages can be sent via the most efficient route which reduces the overall power consumption of the wireless network arrangement, as compared to traditional wireless network arrangements in which any device could serve as the target device.

It is to be appreciated that "devices 12" refers in this example to any one or all of the network devices collectively that are on a predicted route of communication between the target 11 and receiver 2, for example 12a or 12b.

Similarly, "devices 13" as referred to hereafter refers in this example to any one of all of the network devices collectively that are not on a predicted route of communication between the target 11 and receiver 2, for example 13a or 13b.

In FIG. 1, each of said network devices 12 or 13, is accorded a unique suffix, for example "a" or "b" to indicate that a particular device has its own configuration that enables it to function appropriately within the network arrangement, for example by sending out messages only within a particular time slot that has been specifically allocated to the particular device.

This specific configuration of each device ensures that each device has its own communication "slot" so as to avoid overlap of messages sent by devices 12 or 13 comprising the network arrangement.

It is of course to be appreciated that in the event of device malfunction, the system is able to re-route the communication to reach the target device 11 via an alternative route. It is to be further appreciated that the mesh network arrangement may be capable of selecting between a number of alternative routes, in particular in the event of there being more than one efficient route as determined by the number of network devices involved in the communication.

The outgoing broadcast message 3 comprises a list of devices that are to be synchronised with the receiver 2 and control panel 1. Each device 12 that forwards the outgoing broadcast message 3 switches into a constant receive mode for approximately 1 second, immediately after forwarding the message.

Adjacent devices 13 that are not on the predicted route but that are identified in the list of target devices that require synchronisation, as specified by the control panel are able to detect 14 the message 3 and respond to it with a short broadcast acknowledgement message 15 that comprises their current status information.

The short broadcast acknowledgement message 15 is sent by the device 13 during its allocated communication slot. The acknowledgement message 15 also confirms to the receiver 2 and control panel 2 that the devices have updated their respective mode of operation if necessary.

Said adjacent devices 13 typically stagger their respective acknowledgement messages 15 in approximately 1 second intervals.

Devices 12 on the predicted route which have forwarded the outgoing broadcast message 3 immediately switch into a receive mode for approximately 1 second after forwarding the outgoing message 3. Said devices 12 then receive and collate all of the short broadcast acknowledgement messages 15 received from the adjacent devices 13 to produce an array of device data for all adjacent devices 13 that they have received a response 15 from.

For example and as illustrated in FIG. 1, the first device 12a to receive a message from the receiver 2, transmits a message 14 which is capable of being detected by adjacent devices 13 within the network. In the present example, this message 14 is detected by an adjacent device 13a, which then transmits a short broadcast acknowledgement 15 back to the sending device 12a, which has switched to a receive mode, in anticipation of receiving short broadcast acknowledgement messages 14 from adjacent devices. This short broadcast acknowledgment message 14 is then added to the original outgoing broadcast message 3 to form an array of data from all devices that have communicated with the sending device 12a.

This array of data effectively supplements the data comprising the outgoing broadcast message 3 with the additional information received from the adjacent network devices 13.

Once the last device 12c on the predicted route has forwarded the outgoing broadcast message 3 to the target device 11, and finished its 1 second receive window, the last device 12c produces a broadcast acknowledgement 16 comprising all of the collated short broadcast acknowledgements 15 received from adjacent devices 13, as well as its own data.

This broadcast acknowledgement 16 is then sent back as an incoming message to the receiver 2 via the same route as taken by the outgoing broadcast message 3. Any devices 12 that forward this incoming broadcast acknowledgement 16 to the receiver 2 also add their own collated short broadcast acknowledgement messages that they have received from adjacent devices 13, as well as their own data.

It can be appreciated that the aforedescribed method of data synchronisation between the control panel 1 and receiver 2 and network devices, provides a means of synchronisation of a plurality of network devices via a single outgoing broadcast message and single incoming broadcast message.

It will be further appreciated that this concerted method not only saves significant amounts of time in transmitting a message to multiple network devices, but also reduces power consumption of a wireless network arrangement, as compared to a conventional method of device synchronisation as illustrated by route A. This may be particularly useful in relation to battery operated wireless network devices.

Reduced power consumption is further achieved as the receiver 2 is able to transmit a message at a transmit power level that is capable of being detected by more than one device within the network arrangement, such that individual devices may be omitted from active participation in a route between the receiver 2 and a target device, in order to form a successful route of communication using the minimum number of wireless network devices.

When the receiver 2 receives the incoming broadcast acknowledgement message 16, it assesses the data comprising the message 16 and verifies which devices have updated their status or changed their mode of operation accordingly. A data set comprising a list of devices that have not responded is then generated if necessary and a new target device is identified and the aforementioned process of message transmission is repeated.

If, upon repetition of the process, all devices that were identified as requiring synchronisation, respond accordingly to the outgoing broadcast acknowledgement 3, then the process of network device synchronisation is complete.

In the event that a target device fails to respond after three separate communication attempts, then the receiver 2 will attempt to communicate with it via an alternative route comprising devices that have not previously forwarded the outgoing broadcast message 3.

If once all possible routes have been exhausted, the target still fails to respond, the synchronisation process fails and this status is communicated back to the receiver 2 and control panel 1, in order that the malfunction can be investigated and rectified.

It is of course to be appreciated that the invention is not to be restricted to the details of embodiments described above which are described by way of example only.

The invention claimed is:

1. A method for concerted synchronisation of data across a wireless mesh network arrangement, the wireless mesh network arrangement comprising a control panel and a plurality of network devices, the method comprising transmission of a broadcast message to a target device via a predicted route, whereby first network devices are on the predicted route and second network devices are off the predicted route wherein first network devices that are on the predicted route and second network devices that are off the predicted route are configured and arranged to acknowledge the broadcast message and configured and arranged to append data relating to the state and configuration of the respective network devices to a broadcast message, wherein the control panel is configured and arranged to collate and assimilate data received from the network devices, wherein the plurality of network devices is synchronised via one outgoing broadcast message and one incoming broadcast message.

2. A method for concerted synchronisation of data according to claim 1 wherein the method of data communication is capable of being applied to a battery operated wireless mesh network arrangement.

3. A method for concerted synchronisation of data according to claim 2 wherein the mesh network arrangement may comprise a control panel, a receiving device for receiving data from, for example, the control panel and/or other devices within the mesh network arrangement, and a plurality of network devices located with the mesh network, capable of data exchange and communication.

4. A method of concerted synchronisation of data according to claim 3 wherein the control panel is capable of receiving data from devices comprising the mesh network arrangement, such that it may be aware of each device's status at a given time so that the control panel can identify any devices that may be required to transmit or receive data.

5. A method of concerted synchronisation of data according to claim 1 where the control panel is able to communicate collated data to devices within the mesh network, including but not limited to a receiving device.

6. A method of concerted synchronisation of data according to claim 1 wherein the receiving device is able to locate a specific target device within the mesh network arrangement, with which to communicate said data.

7. A method of concerted synchronisation of data according to claim 1 wherein the receiving device is capable of transmitting messages to devices within the mesh network, including but not limited to the control panel and remote network devices.

8. A method of concerted synchronisation of data according to claim 1 where in the receiving device is able to communicate with a target device either directly or via at least one intermediate network device.

9. A method of concerted synchronisation of data according to claim 1 wherein the receiving device is capable of transmitting a single message to a target device, via at least one intermediate device on a communication route.

10. A method of concerted synchronisation of data according to claim 2 where the control panel is able to communicate collated data to devices within the mesh network, including but not limited to a receiving device.

11. A method of concerted synchronisation of data according to claim 3 where the control panel is able to communicate collated data to devices within the mesh network, including but not limited to a receiving device.

12. A method of concerted synchronisation of data according to claim 4 where the control panel is able to communicate collated data to devices within the mesh network, including but not limited to a receiving device.

13. A method of concerted synchronisation of data according to claim 1 where the control panel is able to communicate collated data to devices within the mesh network, including but not limited to a receiving device.

\* \* \* \* \*